US012683457B2

(12) United States Patent
Barck et al.

(10) Patent No.: US 12,683,457 B2
(45) Date of Patent: Jul. 14, 2026

(54) BUS BAR SYSTEM FOR A STATOR ASSEMBLY

(71) Applicant: Volvo Car Corporation, Gothenburg (SE)

(72) Inventors: Christoffer Barck, Gothenburg (SE); Henrique Cunha, Gothenburg (SE); Martin Herna, Gothenburg (SE)

(73) Assignee: Volvo Car Corporation, Gothenburg (SE)

( * ) Notice: Subject to any disclaimer, the term of this patent is extended or adjusted under 35 U.S.C. 154(b) by 103 days.

(21) Appl. No.: 18/594,227

(22) Filed: Mar. 4, 2024

(65) Prior Publication Data

US 2024/0297549 A1      Sep. 5, 2024

(30) Foreign Application Priority Data

Mar. 2, 2023      (EP) ..................................... 23159749

(51) Int. Cl.
*H02K 5/22* (2006.01)

(52) U.S. Cl.
CPC .................................... *H02K 5/225* (2013.01)

(58) Field of Classification Search
CPC .......... H02K 5/225; H02K 15/35; H02K 3/50; H02K 3/38; H02K 2203/09
USPC .......................................................... 310/71
See application file for complete search history.

(56) References Cited

U.S. PATENT DOCUMENTS

| | | | |
|---|---|---|---|
| 4,281,306 A | 7/1981 | Schoendube | |
| 10,465,499 B2 | 11/2019 | Budler | |
| 10,892,658 B2 | 1/2021 | Jang et al. | |
| 2022/0140686 A1* | 5/2022 | Hirai | H02K 3/50 |
| | | | 310/71 |

(Continued)

FOREIGN PATENT DOCUMENTS

| | | |
|---|---|---|
| CN | 212392731 U | 1/2021 |
| DE | 102016209523 A1 | 12/2017 |

(Continued)

OTHER PUBLICATIONS

Communication pursuant to Article 94(3) EPC issued for EP application No. 23159749.3 mailed on Mar. 7, 2024, 11 Pages.

(Continued)

*Primary Examiner* — Charles Reid, Jr.
(74) *Attorney, Agent, or Firm* — Dave Law Group, LLC; Raj S. Davé

(57) ABSTRACT

According to an embodiment, it is a bus bar system comprising, plurality of bus bar members, plurality of spacer members, plurality of pin members; and plurality of locking elements, each of the bus bar members are arranged to form an arc shape and connectable to an individual winding of a stator assembly and are stacked, wherein at least a spacer member is arranged between two individual bus bar members, each bus bar member comprises at least one aperture extending in a transverse direction of the bus bar member, each of the spacer members are arranged substantially cylindrically and comprising a through-hole extending in an axial direction of the spacer member, each pin member is inserted through the apertures of the bus bar members and the through-holes of the spacer members, and fixedly held in position via the locking elements attached to an end of the pin member.

16 Claims, 2 Drawing Sheets

(56) References Cited

U.S. PATENT DOCUMENTS

2023/0198353 A1 *    6/2023  Sangha ................... H02K 3/28
                                                         310/71

FOREIGN PATENT DOCUMENTS

| EP | 3451506 A1 | 6/2021 |
|----|------------|--------|
| JP | S5350497 U | 4/1978 |
| JP | S62149218 U | 9/1987 |
| JP | 6353723 B2 | 6/2018 |
| JP | 2019170013 A | 10/2019 |

OTHER PUBLICATIONS

Search Report issued for EP Application No. 23159749.3, mailed on Aug. 7, 2023, 13 pages.
Interplex Holdings Pte. Ltd., "Realize New EV Possibilities with Our Motor Stator Busbar Innovation," available at https://power.interplex.com/motor-stator-busbars/info/, accessed Oct. 31, 2022.

* cited by examiner

BUS BAR SYSTEM FOR A STATOR ASSEMBLY

CROSS-REFERENCE TO RELATED APPLICATIONS

This application claims the benefit of European Patent Application Number 23159749.3, filed on Mar. 2, 2023, which is hereby incorporated by reference in its entirety.

FIELD OF INVENTION

The present disclosure relates to a bus bar system for a stator assembly of an electric machine.

BACKGROUND

In a stator assembly for the electric machine, stator copper wires or copper windings need a connection to an inverter to admit current flow. Several pin connectors are provided in the stator assembly to allow a current flow connection comprising a three phase system. The pin connectors generally comprise spot welds, which can cause a noise-vibration-harshness (NVH) problem.

Therefore, there is a need to provide an improved bus bar system, which facilitates a reliable connection to stator wires.

SUMMARY

The present disclosure relates to a bus bar system for a stator assembly of an electric machine.

The present disclosure also relates to a stator assembly comprising such bus bar system.

The present disclosure additionally relates to an electric machine comprising such stator assembly.

Furthermore, the present disclosure relates to a manufacturing method for such bus bar system.

Electric machines are used in electric or hybrid vehicles as a traction motor. The traction motor in vehicles is generally configured to generate power for providing a wheel torque to propel the vehicle and to recover braking energy if a regenerative braking system is used.

In a stator assembly for the electric machine, stator copper wires or copper windings need a connection to an inverter to admit current flow. Several pin connectors are provided in the stator assembly to allow a current flow connection comprising three phase system. The pin connectors generally comprise spot welds, which can cause a noise-vibration-harshness (NVH) problem.

Hence, there may be a need to provide an improved bus bar system, which facilitates a reliable connection to stator wires.

The problem is at least partially solved or alleviated by the subject matter of the independent claims of the present disclosure, wherein further examples are incorporated in the dependent claims.

It should be noted that the aspects of the disclosure described in the following apply to the bus bar system for a stator assembly for an electric machine, the stator assembly comprising such a bus bar system, the electric machine comprising such a stator assembly and the manufacturing method for such bus bar system.

According to a first aspect, there is provided a bus bar system for a stator assembly of an electric machine. The bus bar system comprises a first bus bar member, a second bus bar member, a third bus bar member, at least a first spacer member and at least a first pin member. Each bus bar member is connectable to an individual winding of the stator assembly for a current supply. The first bus bar member, the second bus bar member and the third bus bar member are arranged substantially stacked.

The first spacer member is formed substantially cylindrically and comprises a through-hole extending in an axial direction of the first spacer member. The first spacer member is arranged between the first bus bar member and the second bus bar member. The first bus bar member comprises at least a first aperture extending in its transverse direction and the second bus bar member comprises at least a first aperture extending in its transverse direction. The first pin member is inserted through the first aperture of the first bus bar member, the through-hole of the first spacer member and the first aperture of the second bus bar member to align the first bus bar member, the second bus bar member and the first spacer member with each other.

The bus bar system according to the present disclosure provides more reliable connection between stator windings and the current supply. The bus bar members may form one complete package, which may lead to a reduction of noise-vibration-harshness (NVH) of the stator assembly. By providing the spacer member between the bus bar members, an electrical insulation among the bus bar members may be improved and an electrical clearance and an electrical creepage may be prevented. Further, the pin member facilitates an accurate arrangement of the bus bar members before welding, which may result in a high quality welding.

The bus bar system may be mounted at an end portion of the stator assembly, which may be configured to provide a magnetic field that drives a rotor of the electric machine. The stator assembly may comprise at least a stator core and a plurality of windings arranged at the stator core. The windings may comprise coils with wound wires or a wire with a hairpin shape. The bus bar system may be coupled with the plurality of windings to provide current flow generating the magnetic field.

The bus bar system may act as an interface between an inverter generating three-phase current and the stator assembly. Each of the first bus bar member, the second bus bar member and the third bus bar member may be thus connected to each phase on one side to transfer respective phase current and/or phase voltage and to the winding of the stator assembly on the other side.

Each of the first bus bar member, the second bus bar member and the third bus bar member may be substantially plate-shaped such that the bus bar members may be elongated in one direction. Particularly, the bus bar members may be a bow-shaped or arc-shaped. Further, each of the first bus bar member, the second bus bar member and the third bus bar member may comprise at least two coupling arms acting as a terminal, which may be connected to the windings of the stator assembly.

The first bus bar member, the second bus bar member and the third bus bar member may be arranged to at least partially surround the end portion of the stator assembly. In other words, the first bus bar member, the second bus bar member and the third bus bar member may be arranged at least partially along a circumference of the stator assembly when mounted at the stator assembly.

The first bus bar member, the second bus bar member and the third bus bar member may be arranged in a stack. Specifically, the first bus bar member, the second bus bar member and the third bus bar member may be arranged substantially adjacent to each other, next to each other, parallel to each other or on top of each other to form a stacked structure in a vertical direction of the bus bar system. Accordingly, the first bus bar member, the second bus bar member and the third bus bar member together may form a portion of a cylinder in their transverse direction.

The stacked structure of the first bus bar member, the second bus bar member and the third bus bar member may not be limited to a specific order. The second bus bar member may be arranged between the first bus bar member and the third bus bar member, the first bus bar member may be arranged between the second bus bar member and the third bus bar member, or the third bus bar member may be arranged between the first bus bar member and the second bus bar member.

In an example, the first bus bar member, the second bus bar member and the third bus bar member are arranged at least partially offset along an elongated direction of the first, the second and the third bus bar members. In the elongated direction of the bus bar members, the first bus bar member, the second bus bar member and the third bus bar member may be arranged at least partially offset to each other while maintaining the stacked structure. Accordingly, the first bus bar member, the second bus bar member and the third bus bar member may not be completely aligned with each other in the stacked direction. For instance, the first bus bar member may be spaced from the second bus bar member and/or the third bus bar member in a clockwise direction. Alternatively, the third bus bar member may be spaced from the first bus bar member and/or the second bus bar member in a counterclockwise direction.

In an example, the coupling arms of the first bus bar member, the coupling arms of the second bus bar member and the coupling arms of the third bus bar member may be evenly spaced apart from each other, when the first bus bar member, the second bus bar member and the third bus bar member are arranged in the stacked structure. Accordingly, sufficient space between the coupling arms may be provided for good electrical clearance between phases. Furthermore, such sufficient space may be also necessary for the welding process for instance, for the clearance of a gripping tool. By arranging the coupling arms evenly spaced apart from each other, available space given by the length of the bus bar members can be maximized.

The first spacer member may comprise substantially a cylinder shape. The term "substantially cylindrically" may be understood in that the first spacer member may generally comprise a shaft portion. However, an entire contour of the first spacer member may deviate from a cylinder form. For instance, the first spacer member may comprise a shaft portion and a head portion along the axial direction of the first spacer member. Thus, the through-hole may extend through the shaft portion and/or the head portion of the first spacer member.

Each of the first bus bar member, the second bus bar member and the third bus bar member may comprise one or more apertures penetrating in their transverse direction. The term "transverse direction" may be a vertical or perpendicular direction relative to an elongated surface of each of the first bus bar member, the second bus bar member and the third bus bar member.

The first spacer member, particularly the through-hole of the first spacer member may be aligned with the first aperture of the first bus bar member and the first aperture of the second bus bar member. Accordingly, the first aperture of the first bus bar member, the first aperture of the second bus bar member and the through-hole of the first spacer member may form an extended through-hole.

The first pin member may be inserted into the extended through-hole formed by the first aperture of the first bus bar member, the through-hole of the first spacer member and the first aperture of the second bus bar member. Accordingly, the first pin member may be able to secure at least the first bus bar member, the second bus bar member and the first spacer member particularly in the radial direction of the bus bar system.

In an example, the first spacer member may be also arranged between the first bus bar member and the third bus bar member. The first pin member may be inserted through the first aperture of the first bus bar member, the through-hole of the first spacer member and a first aperture of the third bus bar member to align the first bus bar member, the third bus bar member and the first spacer member with each other. Accordingly, the first pin member may be able to secure at least the first bus bar member, the third bus bar member and the first spacer member.

In a further example, the first spacer member may also be arranged between the second bus bar member and the third bus bar member. The first pin member may be inserted through the first aperture of the second bus bar member, the through-hole of the first spacer member and the first aperture of the third bus bar member to align the second bus bar member, the third bus bar member and the first spacer member with each other. Accordingly, the first pin member may be able to secure at least the second bus bar member, the third bus bar member and the first spacer member.

Accordingly, the bus bar members may be fixedly arranged in a desired position before connecting the bus bar system to the stator assembly, for instance by welding, a precise connection between the bus bar system and stator assembly may be achieved.

In an example, the bus bar system further comprises at least one locking element mounted at a distal end of the first pin member to fixedly hold the first bus bar member, the second bus bar member and the first spacer member in the stacked direction. The first bus bar member, the second bus bar member and the first spacer member may be fixedly positioned in the radial direction of the bus bar system. However, the axial or longitudinal arrangement of the bus bar system may also be secured in position to reduce or even avoid the NVH problem.

Accordingly, the first pin member, which is inserted through the first aperture of the first bus bar member, the through-hole of the first spacer member and the first aperture of the second bus bar member may be secured by the locking element opposite to the insertion direction of the first pin member. Preferably, the first pin member and the locking element may be pressed each other to fixedly hold the first bus bar member, the second bus bar member and the first spacer member in their axial direction.

In an example, the first spacer member comprises a first disc portion, a second disc portion and a shaft portion. An outer disc surface of the first disc portion contacts a bottom surface of the first bus bar member and an outer disc surface of the second disc portion contacts a top surface of the second bus bar member. The shaft portion protrudes from the second disc portion axially.

The first spacer member may be made of a plastic material. The first spacer member may comprise a head portion and the shaft portion. The head portion may comprise at least the first disc portion and the second disc portion arranged coaxially and adjacent to each other. The shaft portion may be prolonged from the first disc portion passing through the second disc portion.

The first disc portion may comprise an outer disc surface and an inner disc surface. Similarly, the second disc portion may comprise an outer disc surface and an inner disc surface. The outer disc surface of the first disc portion and the outer disc surface of the second disc portion may be arranged to face away from each other, and the inner disc surface of the first disc portion and the inner disc surface of the second disc portion may be arranged to face each other.

Accordingly, if the first spacer member is positioned between the first bus bar member and the second bus bar member, the outer disc surface of the first disc portion may contact the bottom surface of the first bus bar member, which may be directed to the top surface of the second bus bar member. Additionally, the outer disc surface of the second disc portion may contact the top surface of the second bus bar member. Further, the shaft portion of the first spacer member may be inserted through the first aperture of the second bus bar member.

Hence, a creepage distance or a clearance distance between the first bus bar member and the second bus bar member may be increased due to the distance between the first disc portion and the second disc portion of the first spacer member. The clearance distance can be increased if the distance between the disc portions are increased. The creepage distance can also be increased by make the surface area of the disc portions bigger, since creepage goes along a surface of the spacer member.

In an example, the first spacer member may comprise more than three disc portions to increase the creepage distance or the clearance distance.

In an example, the bus bar system further comprises a fourth bus bar member. The first bus bar member, the second bus bar member, the third bus bar member and the fourth bus bar member are arranged substantially stacked. The fourth bus bar member may be configured to provide neutral to the stator assembly. Accordingly, the fourth bus bar member may be connected to the stator assembly on one side and connected to neutral on the other side.

The first bus bar member, the second bus bar member, the third bus bar member, and the fourth bus bar member may form a substantially stacked structure.

In an example, the first bus bar member, the second bus bar member, the third bus bar member and the fourth bus bar member are arranged at least partially offset along an elongated direction of the first, the second and the third bus bar members. In the elongated direction of the bus bar system, they may be arranged at least partially offset to each other while maintaining the stacked structure. The fourth bus bar member may be arranged above the first bus bar member, between the first bus bar member and the second bus bar member, between the second bus bar member and the third bus bar member, or below the third bus bar member.

In an example, the bus bar system further comprises a second spacer member, a third spacer member and a fourth spacer member. The second spacer member is arranged between the first bus bar member and the second bus bar member, the third spacer member is arranged between the second bus bar member and the third bus bar member, and the fourth spacer member is arranged between the third bus bar member and the fourth bus bar member.

The second spacer member, the third spacer member and the fourth spacer member may be formed substantially cylindrically, and each spacer member comprises a through-hole extending in the axial direction of the respective spacer member. In other words, the first spacer member, the second spacer member, the third spacer member and the fourth spacer member may be formed identically or differently.

Each of the first spacer member, the second spacer member, the third spacer member and the fourth spacer member may be arranged spaced apart from each other along the elongated direction of the first bus bar member, the second bus bar member, the third bus bar member and/or the fourth bus bar member. Alternatively, or additionally, the second spacer member, the third spacer member and the fourth spacer member may be arranged on top of each other along the stacked direction of the first bus bar member, the second bus bar member, the third bus bar ember and the fourth bus bar member. Further, the first spacer member may be the same as the second spacer member.

In an example, each of the second spacer member, the third spacer member and the fourth spacer member comprise a first disc portion, a second disc portion and a shaft portion. The first disc portion of the second spacer member contacts the bottom surface of the first bus bar member and the second disc portion of the second spacer member contacts the top surface of the second bus bar member. The first disc portion of the third spacer member contacts a bottom surface of the second bus bar member and the second disc portion of the second spacer member contacts a top surface of the third bus bar member. The first disc portion of the fourth spacer member contacts a bottom surface of the third bus bar member and the second disc portion of the fourth spacer member contacts a top surface of the fourth bus bar member.

Specifically, an outer disc surface of the first disc portion of the second spacer member may contact the bottom surface of the first bus bar member and an outer disc surface of the second disc portion of the second spacer member may contact the top surface of the second bus bar member, wherein the shaft portion of the second spacer member may protrude from its second disc portion axially. Likewise, an outer disc surface of the first disc portion of the third spacer member may contact the bottom surface of the second bus bar member and an outer disc surface of the second disc portion of the third spacer member may contact the top surface of the third bus bar member, wherein the shaft portion of the third spacer member may protrude from its second disc portion axially. Further, an outer disc surface of the first disc portion of the fourth spacer member may contact the bottom surface of the third bus bar member and an outer disc surface of the second disc portion of the fourth spacer member may contact the top surface of the fourth bus bar member, wherein the shaft portion of the fourth spacer member may protrude from its second disc portion axially. Each shaft portion of the spacer members may comprise a through-hole extending in an axial direction of the respective spacer member.

In an example, the bus bar system further comprises a second pin member and a second locking element. The second pin member is inserted through a second aperture of the first bus bar member, a through-hole of the second spacer member, a second aperture of the second bus bar member, a through-hole of the third spacer member, a first aperture of the third bus bar member, a through-hole of the fourth spacer member and a first aperture of the fourth bus bar member. The second locking element is mounted at a distal end of the second pin member to fixedly hold the bus bar members and the spacer members axially.

In other words, each of the first bus bar member and the second bus bar member may comprise the second aperture extending in the transverse direction of the first bus bar member and the second bus bar member, respectively. Further, each of the third bus bar member and the fourth bus bar member may also comprise at least one aperture extending in the respective transverse direction. The second aperture of the first bus bar member may be same as the first aperture of the first bus bar member and/or the second aperture of the second bus bar member may be same as the first aperture of the second bus bar member.

The second aperture of the first bus bar member, the second aperture of the second bus bar member, the first aperture of the third bus bar member and the first aperture of the fourth bus bar member may be aligned in the stacked direction of the bus bar members.

Preferably, the second spacer member arranged between the first bus bar member and the second bus bar member, the third spacer member arranged between the second bus bar member and the third bus bar member, and the fourth spacer member arranged between the third bus bar member and the fourth bus bar member may be formed substantially identically. In other words, each of the second spacer member, the third spacer member and the fourth spacer member may comprise the first disc portion, the second disc portion and the shaft portion with the through-hole.

Thus, when aligning the apertures of the bus bar members, the second spacer member, the third spacer member and the fourth spacer member may be also aligned in the stacked direction of the bus bar members such that the apertures of the bus bar members and the through-holes of the spacer members may form an extended through-hole, through which the second pin member may be inserted. Further, opposite to the insertion direction of the second pin member, the second locking member may be mounted in order to fixedly hold the bus bar members and the spacer members in the stacked direction of the bus bar members.

In an example, the shaft portion of the second spacer member, the shaft portion of the third spacer member and the shaft portion of the fourth spacer member are stacked axially such that the through-holes of the second spacer member, the third spacer member and the fourth spacer member forming an inserting path for the second pin member.

When aligning the second spacer member, the third spacer member and the fourth spacer member in the stacked direction of the bus bar members in regard to their apertures, the shaft portion of each spacer member, which protrudes from the respective second disc portion may penetrate the aperture of the next bus bar member. For instance, the shaft portion of the second spacer member may penetrate the second bus bar member, the shaft portion of the third spacer member may penetrate the third bus bar member and/or the shaft portion of the fourth spacer member may penetrate the fourth bus bar member.

Accordingly, the shaft portions of the spacer members may be arranged on top of each other, which may lead to a stacked form of the shaft portions. Further, the through-holes extending axially inside the respective shaft portion may also form the continuously closed inserting path for receiving the second pin member. Hence, an electrical insulation among the bus bar members may be improved and an electrical clearance and an electrical creepage may be prevented.

In an example, the first bus bar member, the second bus bar member, the third bus bar member and/or the fourth bus bar are coated with a resin. Accordingly, an electrical insulation among the bus bar members may be improved.

In an example, the bus bar system further comprises several bus bar members, several spacer members, several pin members, and several locking element. Each of the several bus bar members is connectable to an individual winding of the stator assembly. The several bus bar members are arranged substantially stacked.

At least one spacer member is arranged between two individual bus bar members. Each bus bar member comprises at least one aperture extending in its transverse direction. Each of the spacer members is formed substantially cylindrically and comprising a through-hole extending in an axial direction of the spacer member. Each pin member is inserted through the apertures of at least some of the bus bar members and the through-holes of the spacer members to align the several bus bar members with each other. The locking element is attached to an end of the pin member to fixedly hold the bus bar members and the spacer members in an axial direction.

In an example, the several bus bar members are arranged at least partially offset along an elongated direction of the bus bar members.

According to a second aspect, there is provided a stator assembly. The stator assembly comprises a bus bar system as described above. The bus bar system may be arranged at one end portion of the stator assembly to provide reliable current flow.

According to a third aspect, there is provided an electric machine. The electric machine comprises a stator assembly as described above and a rotor assembly. The rotor assembly may be arranged coaxially inside the stator unit and configured to rotate around a longitudinal axis of the electric machine.

According to a fourth aspect, there may be provided a vehicle comprising an electric machine as described above. The vehicle may be a battery electric vehicle (BEV) or a hybrid battery electric vehicle (HEV).

According to a fifth aspect, there is provided a manufacturing method for a bus bar system. The method comprises the steps of, but not necessarily in this order.

arranging a first bus bar member, a second bus bar member and a third bus bar member substantially stacked.

arranging a first spacer member between the first bus bar member and the second bus bar member, and inserting a first pin member through a first aperture of the first bus bar member, a through-hole of the first spacer member and the first aperture of the second bus bar member to align the first bus bar member, the second bus bar member and the first spacer member with each other.

Each bus bar member is connectable to an individual winding of the stator assembly for a power supply. The first spacer member is formed substantially cylindrically and comprises the through-hole extending in an axial direction of the first spacer member. The first bus bar member and the second bus bar member comprise at least the first aperture extending in their transverse direction.

In an example, the method comprises arranging the first bus bar member, the second bus bar member and the third bus bar member at least partially offset along an elongated direction of the first, the second and the third bus bar members.

In an example, the first pin member and the first locking element are pressed against each other to fixedly hold the first bus bar member, the second bus bar member and the first spacer member axially. Accordingly, the first pin member and the first locking element may fixedly hold the first bus bar member and the second bus bar member in position.

In case the pin member is inserted through the first bus bar member, the second bus bar member, the third bus bar member and the fourth bus bar member, the pin member and the corresponding locking element may secure them in position, particularly in the radial direction of the bus bar system.

In an example, the first locking element is welded at a distal end of first pin member. Accordingly, the first locking element may be secured in position in the stacked direction, which may enable in a high quality welding.

According to an embodiment, it is a bus bar system comprising, a first bus bar member, a second bus bar member, a third bus bar member, at least a first spacer member, and at least a first pin member, each bus bar member is connectable to an individual winding of a stator assembly for a current supply, the first bus bar member, the second bus bar member, and the third bus bar member is arranged substantially stacked, the first spacer member is formed substantially cylindrically and comprising a through-hole extending in an axial direction of the first spacer member, the first spacer member is arranged between the first bus bar member and the second bus bar member, the first bus bar member comprising at least a first aperture extending in a transverse direction of the first bus bar member and the second bus bar member comprising at least a second aperture extending in a transverse direction of second bus bar member, and the first pin member is inserted through the first aperture of the first bus bar member, the through-hole of the first spacer member and the second aperture of the second bus bar member to hold the first bus bar member, the second bus bar member and the first spacer member in position; and wherein the bus bar system is configured for the stator assembly of an electric machine.

According to an embodiment, it is a bus bar system comprising, plurality of bus bar members, plurality of spacer members, plurality of pin members; and plurality of locking elements, wherein each of the bus bar members are arranged to form an arc shape and connectable to an individual winding of a stator assembly, wherein the bus bar members are arranged substantially stacked, wherein at least a spacer member is arranged between two individual bus bar members, wherein each bus bar member comprises at least one aperture extending in a transverse direction of the bus bar member, wherein each of the spacer members are arranged substantially cylindrically and comprising a through-hole extending in an axial direction of the spacer member, wherein each pin member is inserted through the apertures of at least two of the bus bar members and the through-holes of the spacer members so as to align the bus bar members and the spacer members with each other, and wherein the locking elements are attached to an end of the pin member to fixedly hold the bus bar members and the spacer members in an axial direction.

According to an embodiment, it is a method comprising: arranging a first bus bar member, a second bus bar member, and a third bus bar member substantially stacked, arranging a first spacer member between the first bus bar member and the second bus bar member, and inserting a first pin member through a first aperture of the first bus bar member, a through-hole of the first spacer member, and the first aperture of the second bus bar member to hold the first bus bar member, the second bus bar member, and the first spacer member in position, wherein each bus bar member is formed in an arc shape and connectable to an individual winding of a stator assembly for a power supply, wherein the first spacer member is formed substantially cylindrically and comprising the through-hole extending in an axial direction of the first spacer member, and wherein the first bus bar member and the second bus bar member comprise at least the first aperture extending in a transverse direction of the first bus bar member and the second bus bar member; and wherein the method is configured for manufacturing of a bus bar system for a stator assembly of an electric machine.

It should be noted that the above examples may be combined with each other irrespective of the aspect involved. Accordingly, the method may be combined with structural features and, likewise, the system may be combined with features described above with regard to the method.

These and other examples of the present disclosure will become apparent from and elucidated with reference to the embodiments described hereinafter.

BRIEF DESCRIPTION OF DRAWINGS

Examples of the present disclosure will be described in the following with reference to the following drawings.

The Figures are merely schematic representations and serves only to illustrate examples of the disclosure. Identical or equivalent elements are in principle provided with the same reference signs.

DETAILED DESCRIPTION

Figure 1:
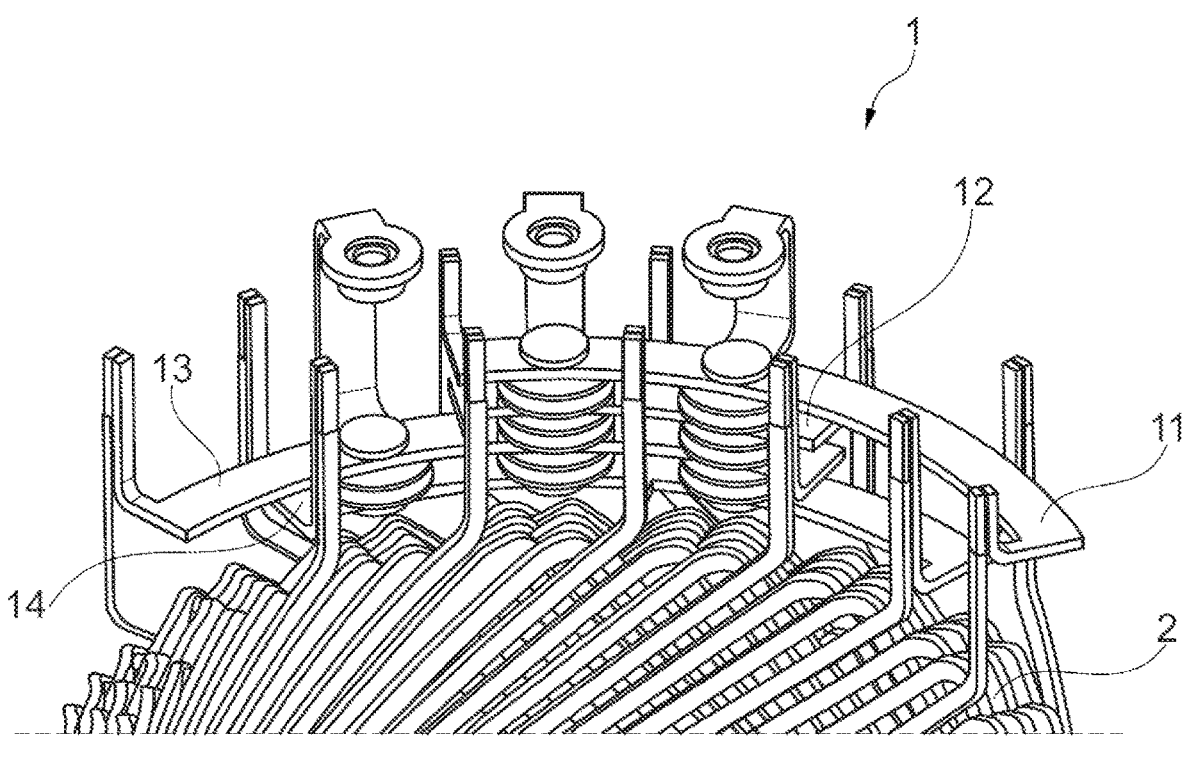
FIG. 1 shows schematically an example of a bus bar system according to the present disclosure.

FIG. 1 shows a bus bar system 1, which may be arranged at one end portion of the stator assembly 2 of an electric machine for a current supply. The bus bar system 1 comprises a first bus bar member 11, a second bus bar member 12, a third bus bar member 13, and a fourth bus bar member 14. Each bus bar member is connectable to an individual winding of the stator assembly 2 for a current supply. The first bus bar member 11, the second bus bar member 12, the third bus bar member 13 and the fourth bus bar member 14 are arranged substantially stacked and at least partially offset along an elongated direction of the respective bus bar members.

Figures 2, 3, 4:
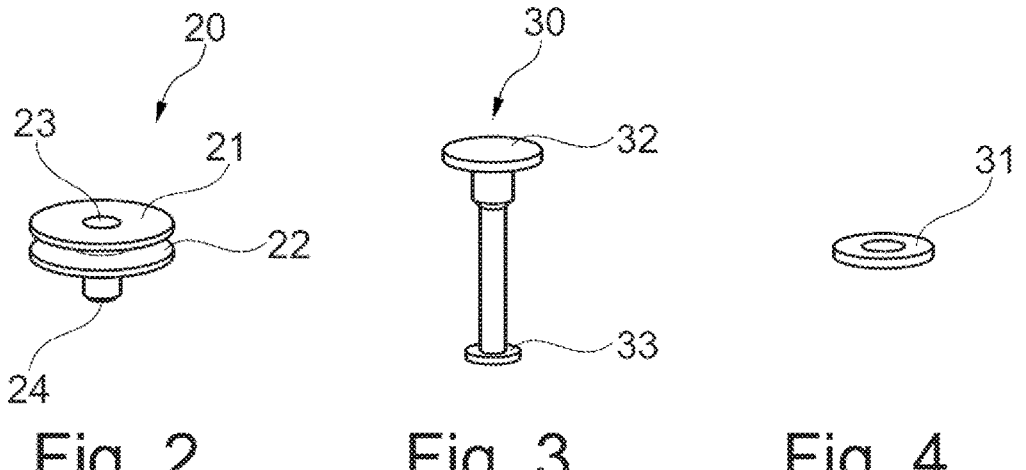
FIG. 2 shows schematically an example of a spacer member according to the present disclosure.
FIG. 3 shows schematically an example of a pin member according to the present disclosure.
FIG. 4 shows schematically an example of a locking element according to the present disclosure.

As shown in FIG. 2, the spacer member 20 is formed substantially cylindrically. The spacer member 20 comprises a first disc portion 21, a second disc portion 22 and a shaft portion 24 with a through-hole 23 extending in an axial direction of the spacer member 20. The shaft portion 24 is prolonged from the first disc portion 21 passing through the second disc portion 22 and protrudes from the second disc portion 22 axially. The first disc portion 21 of the spacer member 20 comprises an outer disc surface 25 (shown in FIG. 5) and an inner disc surface 26 (shown in FIG. 5) and the second disc portion 22 of the spacer member 20 comprises an outer disc surface 28 (shown in FIG. 5) and an inner disc surface 27 (shown in FIG. 5).

Figure 5:
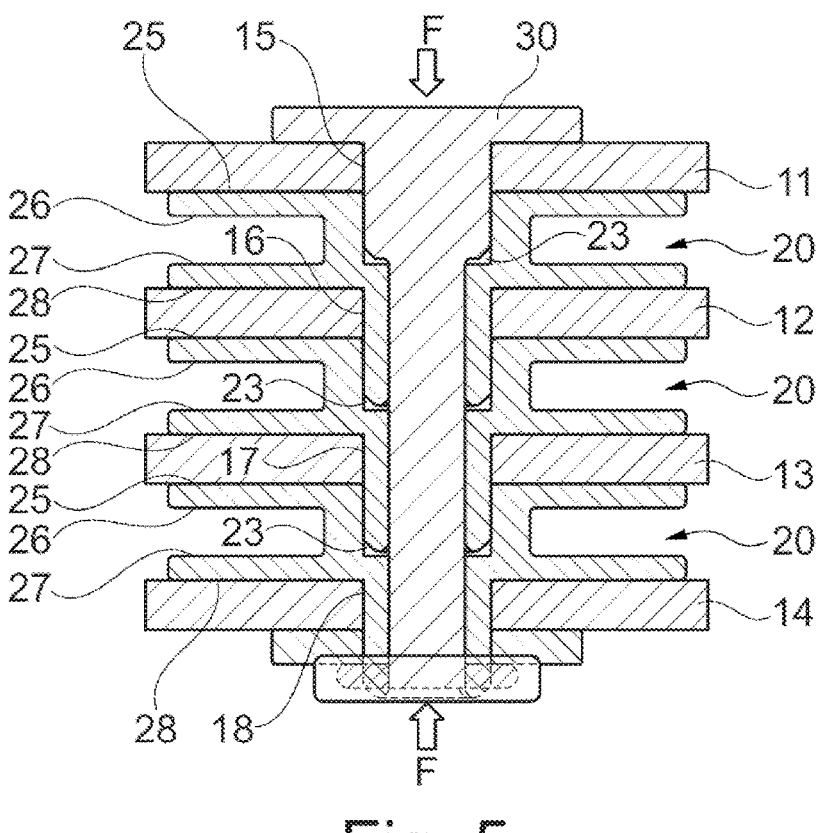
FIG. 5 shows schematically an example of a bus bar system according to the present disclosure.

As shown in FIG. 5, one spacer member 20 can be arranged between two bus bar members. Accordingly, if a first spacer member 20 is arranged between the first bus bar member 11 and the second bus bar member 12, the outer disc surface 25 of the first disc portion 21 contacts a bottom surface of the first bus bar member 11 and the outer disc surface 28 of the second disc portion 22 contacts a top surface of the second bus bar member 12. Likewise, if a second spacer member 20 is arranged between the second bus bar member 12 and the third bus bar member 13, the outer disc surface 25 of the first disc portion 21 of the second spacer member 20 contacts a bottom surface of the second bus bar member 12 and the outer disc surface 28 of the second disc portion 22 of the second spacer member 20 contacts a top surface of the third bus bar member 13. Further, if a third spacer member 20 is arranged between the third bus bar member 13 and the fourth bus bar member 14, the outer disc surface 25 of the first disc portion 21 of the third spacer member 20 contacts a bottom surface of the third bus bar member 13 and the outer disc surface 28 of the second disc portion 22 of the third spacer member 20 contacts a top surface of the fourth bus bar member 14.

Each of the first bus bar member 11, the second bus bar member 12, the third bus bar member 13, and the fourth bus bar member 14 comprises at least one aperture 15, 16, 17, 18 extending in their transverse direction. Through the aperture 16 of the second bus bar member 12, the shaft portion 24 of the first spacer member 20 is received onto the second spacer member 20. Similarly, through the aperture 17 of the third bus bar member 13, the shaft portion 24 of the second spacer member 20 is received onto the third spacer member 20. Further, the shaft portion 24 of the third spacer member 20 penetrates through the aperture 18 of the fourth bus bar member 14.

Accordingly, the through-holes 23 of the first, the second, and the third spacer members 20 form a passage, through which the pin member 30 may be inserted. As shown in FIG. 3, the pin member 30 is formed substantially cylindrically and comprises a head portion 32 and a distal end 33. Preferably, the head portion 32 may comprise a bigger diameter than the apertures of the bus bar members such that the head portion 32 is not slipped through the bus bar members. In other words, the head portion 32 of the pin member 30 may be fixedly attached to a top surface of the first bus bar member 11.

FIG. 4 shows a locking element 31, which may be formed as a nut. The locking element 31 is mounted at the distal end 33 of the pin member 30 to fixedly hold the first bus bar member 11, the second bus bar member 12, the third bus bar member 13, the fourth bus bar member 14 and the spacer members 20 in the stacked direction of the bus bar members. When mounting the locking element 31, the pin member 30 and the locking element 31 are pressed against each other to tightly align the bus bar members in position. In addition, the locking element 31 can be welded at the distal end 33 of the pin member 30, for instance by utilizing ultrasonic. To electrically isolate each component, the spacer members 20, the pin member 30, and the locking element 31 are made of plastic material.

Figures 6, 7:
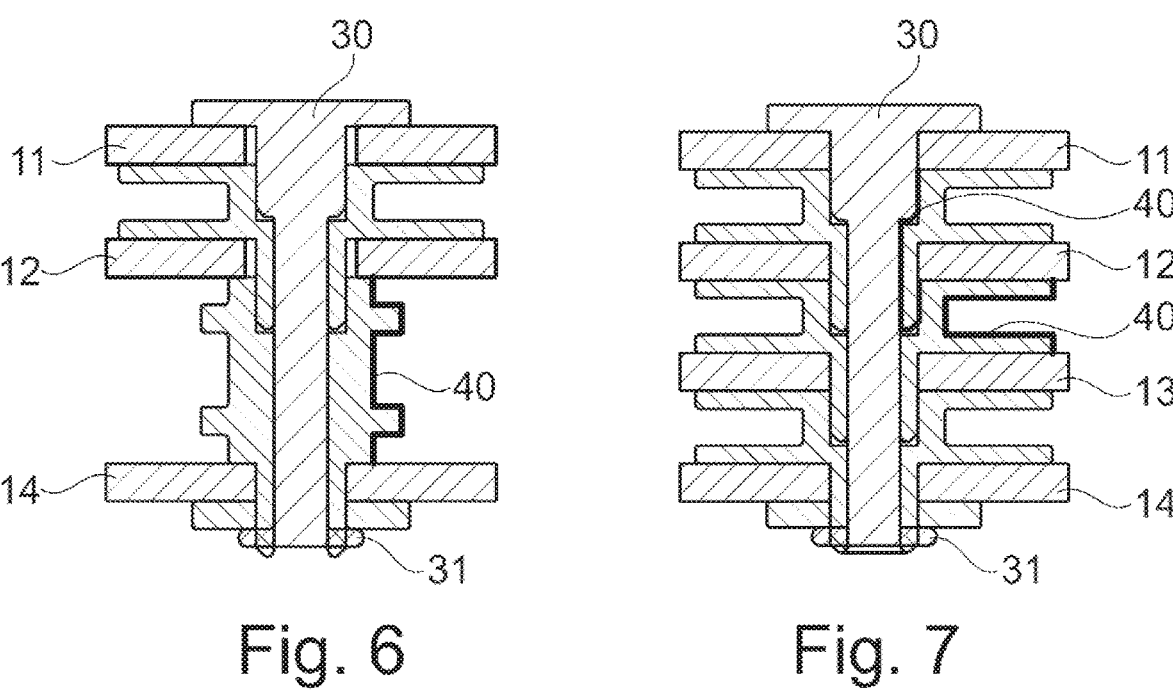
FIG. 6 shows schematically an example of a bus bar system according to the present disclosure.
FIG. 7 shows schematically an example of a bus bar system according to the present disclosure.

FIG. 6 and FIG. 7 show a creepage distance between the neighboring bus bar members. By providing the spacer members 20 comprising two disc portions and a stacked arrangement of the spacer members 20 among the bus bar members, the creepage distance can be increased, since creepage goes along a surface of the spacer member. Thus, a reliable insulation between the components of the bus bar system 1 may be achieved.

Other variations to the disclosed examples can be understood and effected by those skilled in the art in practicing the claimed disclosure, from the study of the drawings, the disclosure, and the appended claims. In the claims the word "comprising" does not exclude other elements or steps and the indefinite article "a" or "an" does not exclude a plurality. A single processor or other unit may fulfill the functions of several items or steps recited in the claims. The mere fact that certain measures are recited in mutually different dependent claims does not indicate that a combination of these measures cannot be used to advantage. A computer program may be stored/distributed on a suitable medium such as an optical storage medium or a solid-state medium supplied together with or as part of other hardware, but may also be distributed in other forms, such as via the Internet or other wired or wireless telecommunication systems. Any reference signs in the claims should not be construed as limiting the scope of the claims.

As used herein, the terms "first," "second," "third," and the like in the description and in the claims, if any, distinguish between similar elements and do not necessarily describe a particular sequence or chronological order. The terms are interchangeable under appropriate circumstances such that the embodiments herein are, for example, capable of operation in sequences other than those illustrated or otherwise described herein. Furthermore, the terms "include," "have," and any variations thereof, cover a non-exclusive inclusion such that a process, method, system, article, device, or apparatus that comprises a list of elements is not necessarily limiting to those elements, but may include other elements not expressly listed or inherent to such process, method, system, article, device, or apparatus.

As used herein the term "component" refers to a distinct and identifiable part, element, subsystem, or unit within a larger system, structure, or entity. It is a building block that serves a specific function or purpose within a more complex whole. Components are often designed to be modular and interchangeable, allowing them to be combined or replaced in various configurations to create or modify systems. Components may be a combination of mechanical, electrical, hardware, firmware, software and/or other engineering elements.

While this specification contains many specifics, these do not construe as limitations on the scope of the disclosure or of the claims, but as descriptions of features specific to particular implementations. A single implementation may implement certain features described in this specification in the context of separate implementations. Conversely, multiple implementations separately or in any suitable sub-combination may implement various features described herein in the context of a single implementation. Moreover, although features described herein as acting in certain combinations and even initially claimed as such, one or more features from a claimed combination may in some cases be excised from the combination, and the claimed combination may be directed to a sub-combination or variation of a sub-combination.

Even though particular combinations of features are recited in the claims and/or disclosed in the specification, these combinations are not intended to limit the disclosure of possible implementations. Other implementations are within the scope of the claims. For example, the actions recited in the claims may be performed in a different order and still achieve desirable results. In fact, many of these features may be combined in ways not specifically recited in the claims and/or disclosed in the specification. Although each dependent claim may directly depend on only one claim, the disclosure of possible implementations includes each dependent claim in combination with every other claim in the claim set.

13

REFERENCE SIGNS 1 bus bar system
2 stator assembly
11 first bus bar member
12 second bus bar member
13 third bus bar member
14 fourth bus bar member
15 aperture of the first bus bar member
16 aperture of the second bus bar member
17 aperture of the third bus bar member
18 aperture of the fourth bus bar member
20 spacer member
21 first disc portion of the spacer member
22 second disc portion of the spacer member
23 through-hole of the spacer member
24 shaft portion of the spacer member
25 outer disc surface of the first disc portion of the spacer member
26 inner disc surface of the first disc portion of the spacer member
27 inner disc surface of the second disc portion of the spacer member
28 outer disc surface of the second disc portion of the spacer member
30 pin member
31 locking element
32 head portion of the pin member
33 distal end of the pin member

What is claimed is:

1. A bus bar system comprising,
a first bus bar member;
a second bus bar member;
a third bus bar member;
at least a first spacer member; and
at least a first pin member;
each bus bar member is connectable to an individual winding of a stator assembly for a current supply;
the first bus bar member, the second bus bar member, the third bus bar member are bow-shaped of arc-shaped;
the first bus bar member, the second bus bar member, and the third bus bar member is are arranged substantially stacked and at least partially offset along an elongated direction of the first bus bar member, the second bus bar member, and the third bus bar members the first spacer member is formed substantially cylindrically and comprising a through-hole extending in an axial direction of the first spacer member;
the first spacer member is arranged between the first bus bar member and the second bus bar member, the first bus bar member comprising at least a first aperture extending in a transverse direction of the first bus bar member and the second bus bar member comprising at least a first aperture extending in a transverse direction of the second bus bar member; and
the first pin member is inserted through the first aperture of the first bus bar member, the through-hole of the first spacer member and the first aperture of the second bus bar member to hold the first bus bar member, the second bus bar member and the first spacer member in position;
wherein the first spacer member comprising
a first disc portion comprising a first disc portion outer disc surface and a first disc portion inner disc surface;

a second disc portion comprising a second disc portion outer disc surface and a second disc portion inner disc surface;
a shaft portion;
the first disc portion, the second disc portion and the shaft portion integrally connected;
the first disc portion outer disc surface of the first disc portion contacting a bottom surface of the first bus bar member and the second disc portion outer disc surface of the second disc portion contacting a top surface of the second bus bar member; and
the shaft portion protruding from the second disc portion axially; and
wherein the bus bar system is configured for the stator assembly of an electric machine.

2. The bus bar system of claim 1, further comprising at least one locking element, wherein the locking element is mounted at a distal end of the first pin member to fixedly hold the first bus bar member, the second bus bar member, and the first spacer member axially.

3. The bus bar system of claim 1, further comprising a fourth bus bar member, wherein the first bus bar member, the second bus bar member, the third bus bar member, and the fourth bus bar member is arranged substantially stacked.

4. The bus bar system of claim 3, wherein the first bus bar member, the second bus bar member, the third bus bar member, and the fourth bus bar member are arranged at least partially offset along the elongated direction of the first bus bar member, the second bus bar member, and the third bus bar members.

5. The bus bar system of claim 4, further comprising a second spacer member, a third spacer member and a fourth spacer member,
wherein the second spacer member is arranged between the first bus bar member and the second bus bar member, the third spacer member is arranged between the second bus bar member and the third bus bar member, and the fourth spacer member is arranged between the third bus bar member and the fourth bus bar member.

6. The bus bar system of claim 5, further comprising a second pin member and a second locking element,
wherein the second pin member is inserted through a second aperture of the first bus bar member, a through-hole of the second spacer member, a second aperture of the second bus bar member, a through-hole of the third spacer member, a first aperture of the third bus bar member, a through-hole of the fourth spacer member, and a first aperture of the fourth bus bar member, and
wherein the second locking element is mounted at a distal end of the second pin member.

7. The bus bar system of claim 6, wherein each of the second spacer member, the third spacer member, and the fourth spacer member comprising a first disc portion, a second disc portion, and a shaft portion,
wherein the first disc portion of the second spacer member contacting a bottom surface of the first bus bar member, the second disc portion of the second spacer member contacting a top surface of the second bus bar member,
wherein the first disc portion of the third spacer member contacting a bottom surface of the second bus bar member, the second disc portion of the second spacer member contacting a top surface of the third bus bar member, and
wherein the first disc portion of the fourth spacer member contacting a bottom surface of the third bus bar member, the second disc portion of the second spacer member contacting a top surface of the fourth bus bar member.

8. The bus bar system of claim 7, the shaft portion of the second spacer member, the shaft portion of the third spacer member, and the shaft portion of the fourth spacer member is stacked axially such that the through-holes of the second spacer member, the through-hole of the third spacer member, and the through-hole of the fourth spacer member forms an inserting path for the second pin member.

9. The bus bar system of claim 3, wherein the fourth bus bar member is coated with a resin.

10. The bus bar system of claim 1, wherein the first bus bar member, the second bus bar member, the third bus bar member, are coated with a resin.

11. A bus bar system comprising,
plurality of bus bar members;
plurality of spacer members;
plurality of pin members; and
plurality of locking elements;
wherein each of the bus bar members are arranged to form a bow-shape or an arc shape and connectable to an individual winding of a stator assembly;
wherein the plurality of the bus bar members are arranged substantially stacked and at least partially offset along an elongated direction of the bus bar members;
wherein at least a spacer member is arranged between two individual bus bar members, wherein the spacer member comprises:
    a first disc portion comprising a first disc portion outer disc surface and a first disc portion inner disc surface;
    a second disc portion comprising a second disc portion outer disc surface and a second disc portion inner disc surface;
    a shaft portion, wherein the shaft portion protruding from the second disc portion axially, and
    the first disc portion, the second disc portion and the shaft portion integrally connected;
wherein each bus bar member comprises at least one aperture extending in a transverse direction of the bus bar members;
wherein each of the spacer members are arranged substantially cylindrically and comprising a through-hole extending in an axial direction of the spacer member;
wherein each pin member is inserted through the apertures of at least two of the bus bar members and the through-holes of each of the spacer members so as to align the bus bar members with each other; and
wherein the locking elements are attached to an end of the pin member to fixedly hold the bus bar members and the spacer members in the axial direction of the spacer member.

12. The bus bar system of claim 11, wherein the bus bar system is a component of the stator assembly.

13. The bus bar system of claim 12, wherein the stator assembly is a component of an electric machine.

14. A method comprising:
arranging a first bus bar member, a second bus bar member, and a third bus bar member substantially stacked and at least partially offset along an elongated direction of the first bus bar member, the second bus bar member, and the third bus bar member;
arranging a first spacer member between the first bus bar member and the second bus bar member, wherein the first spacer member comprises,
    a first disc portion comprising a first disc portion outer disc surface and a first disc portion inner disc surface,
    a second disc portion comprising a second disc portion outer disc surface and a second disc portion inner disc surface;
    a shaft portion;
    the first disc portion, the second disc portion and the shaft portion integrally connected;
    the first disc portion outer disc surface of the first disc portion contacting a bottom surface of the first bus bar member and the second disc portion outer disc surface of the second disc portion contacting a top surface of the second bus bar member; and
    the shaft portion protruding from the second disc portion axially; and
    inserting a first pin member through a first aperture of the first bus bar member, a through-hole of the first spacer member, and a first aperture of the second bus bar member to hold the first bus bar member, the second bus bar member, and the first spacer member in position;
wherein each bus bar member is formed in a bow-shape or an arc shape and connectable to an individual winding of a stator assembly for a power supply;
wherein the first spacer member is formed substantially cylindrically and comprising the through-hole extending in an axial direction of the first spacer member; and
wherein the first bus bar member and the second bus bar member comprise at least the first aperture extending in a transverse direction of the first bus bar member and the second bus bar member; and
wherein the method is configured for manufacturing of a bus bar system for the stator assembly of an electric machine.

15. The method of claim 14, wherein the first pin member and a first locking element are pressed against each other to fixedly hold the first bus bar member, the second bus bar member, and the first spacer member axially.

16. The method of claim 14, wherein a first locking element is welded at a distal end of the first pin member.

* * * * *